O. HECKEL.
VEHICLE WHEEL.
APPLICATION FILED NOV. 13, 1911.

1,193,383.

Patented Aug. 1, 1916.

WITNESSES
William C. Sinton.
Charles S. Wilson

INVENTOR
O. Heckel
By Wm. C. McIntire Attorney

UNITED STATES PATENT OFFICE.

OTTO HECKEL, OF ST. LOUIS, MISSOURI, ASSIGNOR OF ONE-FOURTH TO MATTHEW D. VOSBURG AND ONE-HALF TO LOWELL T. RAMBO, BOTH OF ST. LOUIS, MISSOURI.

VEHICLE-WHEEL.

1,193,383.  Specification of Letters Patent.  Patented Aug. 1, 1916.

Application filed November 13, 1911. Serial No. 660,035.

*To all whom it may concern:*

Be it known that I, OTTO HECKEL, a citizen of the United States, residing at St. Louis, in the State of Missouri, have invented certain new and useful Improvements in Vehicle-Wheels; and I do hereby declare the following to be a full, clear, and exact description of the invention, such as will enable others skilled in the art to which it appertains to make and use the same.

This invention relates to new and useful improvements in vehicle wheels, and is designed to construct a resilient wheel adapted for use primarily for automobiles.

It is further designed to provide a means whereby an increased resistance may be provided as the load on the vehicle is increased, thereby eliminating damage to the elements of said wheel caused by forcible contact.

It is also designed to provide a means for a thorough resiliency and at the same time a positive return of the elements to their normal position upon the release of the compressional parts.

Figure 1:
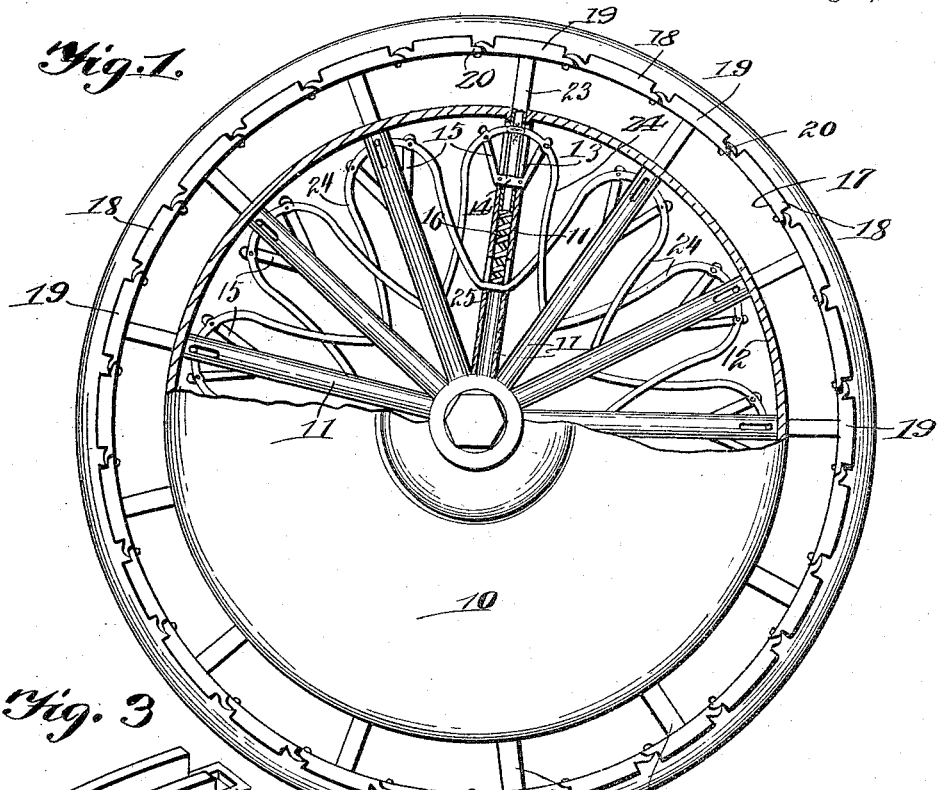
Figure 3:
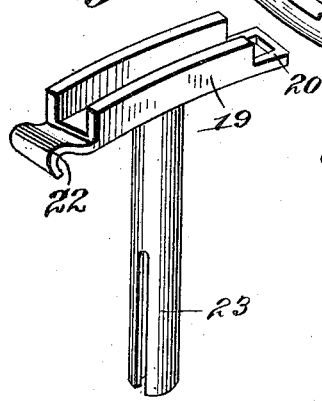
Figure 4:
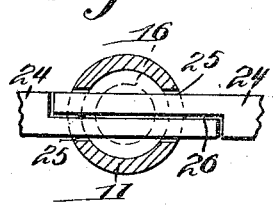
Figure 2:
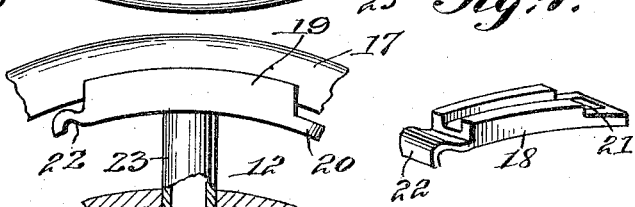
Figure 5:
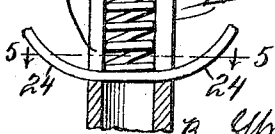

With the above and other objects in view, this invention consists in the construction, combination and arrangement of parts, all as hereinafter more fully described, claimed and illustrated in the accompanying drawings, wherein:

Figure 1 is a side elevation of a wheel constructed in accordance with the present invention with parts thereof broken away; Fig. 2 is an enlarged detail longitudinal section of one of the tubular casings adapted to contain and coöperate with the resilient members, Figs. 3 and 4 are perspective views of the heads and links respectively, which form in combination the prior containing member, and Fig. 5 is a section taken along line 5—5 of Fig. 2.

The wheel forming the subject matter of the present invention comprises a hub having radially extending therefrom a plurality of tubular spokes, said tubular spokes being longitudinally slotted. At the outer terminals of the spokes is carried a solid metal rim which is rigidly secured to said spokes. A flexible rim which acts as a retainer for the solid rubber tire is connected to the tubular members by a series of inwardly projecting lugs which coöperate with a coil spring and levers to provide resiliency for the wheel, as will hereinafter be more fully described.

Referring more particularly to the drawings, 10 indicates a hub of any suitable construction and material having radially extending therefrom a series of tubular metal spokes 11 to the outer terminals of which is rigidly secured a solid inner rim 12. The inner rim 12 is provided with openings in alinement with the tubular spokes 11, to allow connection between the lugs 23 of the outer rim and the tubular spoke 11. The tubular spokes 11 are provided with the diametrically disposed longitudinal slots 13, in which are secured the transversely arranged bars 14, which carry at their terminals the arms 15, said arms being disposed at an angle to said bars. In each spoke a coil spring 16 is interposed between the lugs 23 and the end of the levers 24 thereby forcing the lugs 23 outwardly from the spokes 11.

The outer rim, which carries the tire 17, is spaced from the inner rim 12 and comprises a series of links 18, which are constructed in sections, said sections being connected by heads 19. The links 18 and the heads 19 are each provided with the lugs 20 having openings 21 therein at one end thereof and with hooks 22 at the opposite end thereof, which retain the tire securely to said rim. Each head is provided at the terminals thereof with the orificed projections 21 at one end and with hooks 22 at the opposite end, as in the case of the links, which are adapted to receive the lugs 20 formed on the links, thereby flexibly connecting the links to the heads.

Centrally disposed on the under side of each head is an inwardly extending split lug 23, the arms formed by the bifurcation of which are adapted to span the bars 14, and reciprocate within the spokes 11 against the springs 16.

From the foregoing, it will readily be understood that the pressure of the springs 16 upon the lugs 23 force the latter outwardly, thereby imparting a similar motion to the heads 19, at the same time giving to the solid tire 17 approximately the same resiliency as is obtained from a pneumatic tire.

A lever 24 is pivoted to each arm 15 and extends into the adjacent spoke 11, and is secured to the lug 23 of the head 19. The opposite terminals of the lever 24 operate in the slot 25 formed in the next adjacent spoke and is recessed as at 26, to receive the similar terminal of the lever coöperating with the spoke oppositely disposed thereto, as is clearly illustrated in Fig. 5.

As the weight of the vehicle is brought to bear upon the heads 19, it forces the shank 23 of the coöperating head 19 inwardly against the pressure of the coiled springs 16 until the bar 14 arrives at the inward extremity of its slot 27. From this point the bar 14 affords a fulcruming means to the lever 24, the outer end of which, having arrived at the outer end of slot 28 is actuated by the weight of the vehicle and, acting as a lever of the third class, impels the opposite end of said lever 25 outwardly against the pressure of the spring 16 in the adjacent spoke.

It will further be understood that as soon as the weight is removed from the head 19, the latter is returned to its normal position due to the extreme resiliency of the aforesaid spring.

Having thus fully described my invention, what I claim as new and desire to secure by U. S. Letters Patent, is:

A vehicle wheel comprising a hub, tubular spokes secured to said hub and provided with oppositely disposed slots therein, an inner rim secured to said spokes and provided with openings therein, bars secured to said spokes and extending therethrough, upwardly directed arms formed on said bars, lugs provided with bifurcated lower ends reciprocately mounted within said spokes and adapted to receive said bars between the arms, levers pivoted to said arms and pivotally secured to said lugs, the opposite end of said levers extended into the next adjacent spokes and adapted to interlock with the next adjacent lever, a coil spring interposed between the lugs and the lower ends of the levers adapted to move the lower end of the levers in one direction and move the lugs in an opposite direction, and a flexible outer rim carrying a tire secured to the lugs.

In testimony whereof I affix my signature in the presence of two witnesses.

OTTO HECKEL.

Witnesses:
GEORGE JOHNS,
ERNST SPELLMEYER.

Copies of this patent may be obtained for five cents each, by addressing the "Commissioner of Patents, Washington, D. C."